United States Patent
Heidenreich et al.

(10) Patent No.: US 6,390,366 B1
(45) Date of Patent: May 21, 2002

(54) CURRENCY EXCHANGE AND MERCHANDISE SALES SYSTEM AND METHOD

(75) Inventors: Sharon K. Heidenreich, Highlands Ranch; Anthony J. Selway, Denver, both of CO (US); Woodrow Hendricks Danda, Atlanta, GA (US); Daniel Ebert, Highlands Ranch, CO (US); Gael Ellen Jose, Pinecrest, FL (US); Jeffrey Shafer, Highlands Ranch; Robert F. Drab, Denver, both of CO (US)

(73) Assignee: First Data Corp., Englewood, CO (US)

( * ) Notice: Subject to any disclaimer, the term of this patent is extended or adjusted under 35 U.S.C. 154(b) by 0 days.

(21) Appl. No.: 09/653,497

(22) Filed: Aug. 31, 2000

(51) Int. Cl.$^7$ .............................................. G07B 15/02
(52) U.S. Cl. ...................................... 235/384; 235/381
(58) Field of Search ................................ 235/381, 384; 705/4

(56) References Cited

U.S. PATENT DOCUMENTS 6,003,008 A * 12/1999 Postrel et al. ............... 235/381

* cited by examiner

*Primary Examiner*—Harold I. Pitts
(74) *Attorney, Agent, or Firm*—Shughart Thomson & Kilroy, P.C.

(57) ABSTRACT

A currency exchange and merchandise sales system includes a point-of-sale (POS) computer for inventorying currency and merchandise and for recording transactions involving same. A cash/currency processing computer (CPC) is located remote from the POS computer and receives data therefrom and transfers data thereto. The system is adapted for conducting currency exchange and merchandise sales transactions among passengers on a vehicle, such as an airliner, particularly on international flights. A security drawer is removably mounted in an airliner service cart packed with merchandise. The security drawer receives currency used for foreign currency exchange (FX) and for merchandise sales transactions. A currency exchange and merchandise sales method includes the steps of inventorying the currency and merchandise and loading same in the security drawer and the service cart preflight. Currency exchange and merchandise sales transactions are conducted by the aircrew in-flight and recorded on the POS computer. Data from the POS computer is transferred to the CPC computer post-flight for reconciliation, report generation and payment distribution.

26 Claims, 16 Drawing Sheets

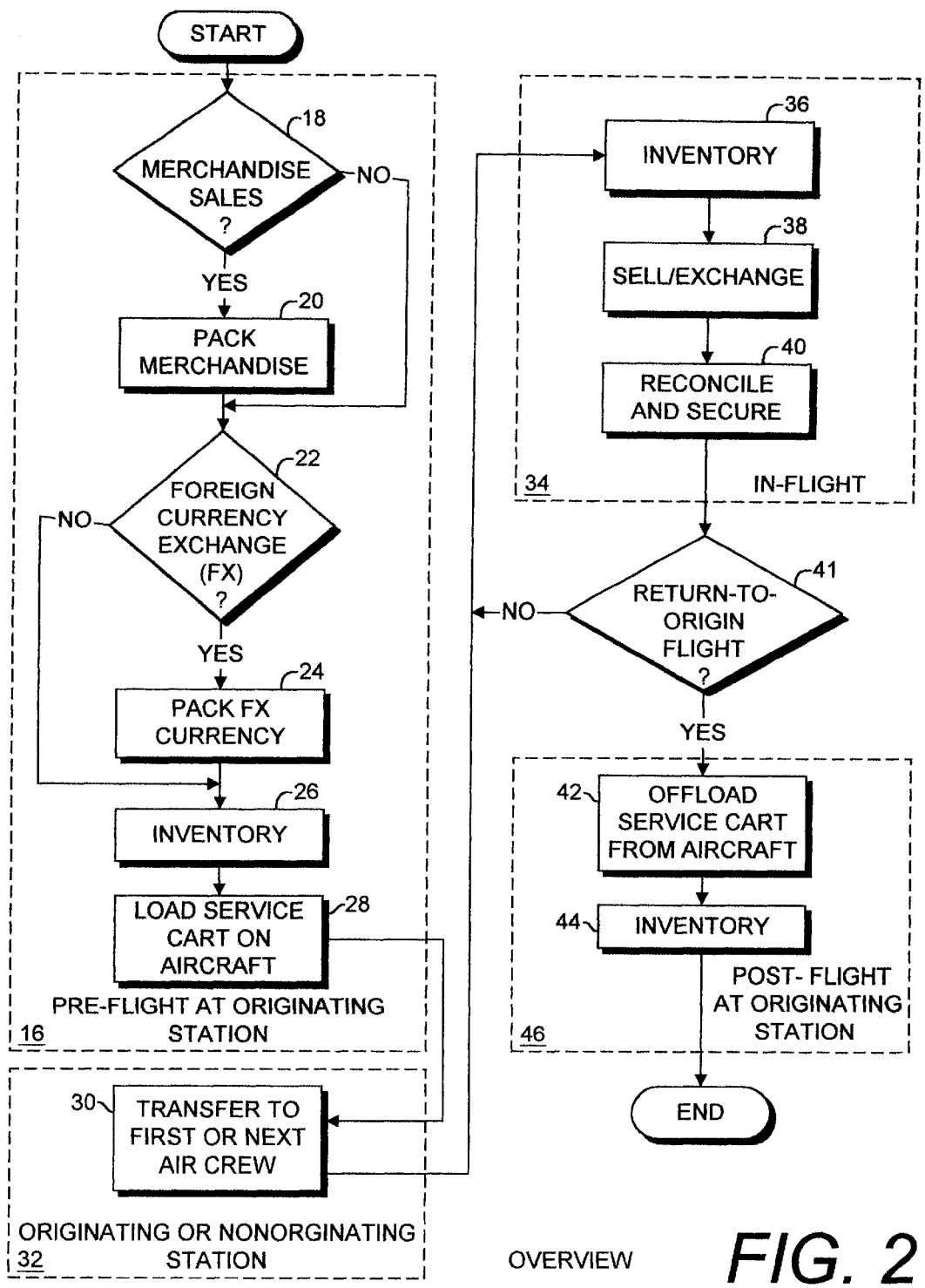
OVERVIEW *FIG. 2*

PRE-FLIGHT AT ORIGINATING STATION/SECURITY DRAWER

PRE-FLIGHT AT ORIGINATING STATION/MERCHANDISE

PRE-FLIGHT AT ORIGINATING STATION/CART STAGING

PRE-FLIGHT AT ORIGINATING STATION/TRANSFER TO FIRST AIR CREW

PRE-FLIGHT AT NONORGINATING STATION/TRANSER TO NEXT AIR CREW

POST-FLIGHT AT ORIGINATING STATION/CLOSEOUT

POST-FLIGHT AT ORGINATING STATION/CART HANDLING

No. 0003032

CASH SUMMARY FORM

PLEASE COMPLETE INFORMATION CORRECTLY

| DATE(DD/MM/YY) | | Flight No. | |
|---|---|---|---|
| Cash Handler F/A | | Employee No. | |
| Second F/A | | Employee No. | |

Opening Count

| Currency | Denomination | Count | Verified | Both F/A'S INITIAL SEAL AND CASH COUNT |
|---|---|---|---|---|
| Japanese | 10,000 | 5 | | Seal No. 4230 |
| Japanese | 5,000 | 20 | | |
| Japanese | 1,000 | 15 | | Cash Handler _____ |
| Japanese | 500 | 10 | | |
| Japanese | 100 | 15 | | Second F/A _____ |
| Canadian | 10 | 5 | | |
| Canadian | 5 | 5 | | CSD _____ (discrepancies only) |
| Canadian | 2 | 10 | | |
| Canadian | 1 | 10 | | |
| | | | | |

Cash Discrepancies:

FOR SKYTELLER USE ONLY

| Airline cd | Flight # | Segment YOR-NRT | FLIGHT DATE(DD/MM/YY) 18/2/00 |
|---|---|---|---|
| Date Prepared 14/2/00 | | 1st Count TB | Verified AD | DPC-WR |
| Date Reconciled 24/02/00 | | 1st Count | Verified | OPO |

← 272

Closing Count

| Canada | Quantity | Total | US | Quantity | Total | Japan | Quantity | Total | Other Currencies | Total | Both F/A'S INITIAL SEAL AND CASH COUNT |
|---|---|---|---|---|---|---|---|---|---|---|---|
| 100 | × | | 100 | × | | 10,000 | × | | | | Seal No. 57 |
| 50 | × | | 50 | × | | 5,000 | × | | | | |
| 20 | × | | 20 | × | | 1,000 | × | | | | Cash Handler _____ |
| 10 | × | | 10 | × | | 500 | × | | | | |
| 5 | × | | 5 | × | | 100 | × | | | | Second F/A _____ |
| 2 | × | | 1 | × | | | × | | | | |
| 1 | × | | | | | | | | | | CSD _____ (discrepancies only) |
| TOTAL | | | TOTAL | | | TOTAL | | | | | |

| | | | | | | | | | | | |
|---|---|---|---|---|---|---|---|---|---|---|---|
| Cash | | | Cash | | | Cash | | | | | |
| Trav Cheq | | | Trav Cheq | | | Trav Cheq | | | | | |
| Vouchers | | | Vouchers | | | Vouchers | | | | | |

Cash Discrepancies:

Comments, Suggestions, Questions:

FIG. 7

CURRENCY EXCHANGE AND MERCHANDISE SALES SYSTEM AND METHOD

BACKGROUND OF THE INVENTION

1. Field of the Invention

The present invention relates generally to currency exchange and merchandise sales transactions and equipment, and in particular to a system and method for handling merchandise sales and foreign currency exchange on commercial airline flights utilizing a service cart with a security drawer.

2. Description of the Prior Art

Passengers on commercial aircraft and other vehicles represent commercial opportunities for merchandise sales. For example, on international flights merchandise sales can often be made "duty-free". Duties assessed on various consumer goods can be substantial in a number of countries. Therefore, duty-free sales tend to be relatively popular among international travelers, particularly with relatively expensive, luxury-type items.

Duty-free merchandise inventories can be stowed in the service carts commonly used by airlines for in-flight food and beverage service. The service carts are stocked with merchandise, food and beverages by vendors and caterers at airports for loading on outbound flights. The flight attendants sell duty-free merchandise to passengers in much the same way as beverage sales are handled. Empty carts are offloaded for restocking.

Service carts tend to be relatively uniform in size to facilitate stowing in standard-size airliner galleys and to facilitate passing through the aisles. They are subject to applicable regulations and certifications for airline use. For example, the Federal Aviation Administration (FAA) certifies equipment for use on airliners in the United States. Therefore, an important objective in utilizing service carts for currency exchange and merchandise sales is to avoid modifying the carts. Such modifications, even if allowed, could require FAA recertification.

Service carts on international flights have previously been utilized for currency exchange. For example, U.S. Pat. No. 6,003,008 and Des. 406,270, which are assigned to a common assignee herewith, disclose point-of-sale devices for mounting on top of airline service carts. Such devices receive currency and process transactions, including currency exchange and merchandise sales. However, more compact equipment is desirable to comply with airliner weight restrictions and size limitations.

Currency conversion represents another type of commercial opportunity among airline passengers. Relativity high percentages of international travelers convert currency. Although currency conversion transactions can be conducted in both the originating and destination countries, in-flight conversion tends to be considerably more convenient than the alternative of locating a financial institution before or after traveling. Moreover, in-flight currency exchange can accommodate passengers' requirements for local currency for ground transportation and other needs on arrival.

Duty-free sales and foreign currency exchange provide revenue for airlines and other entities which receive portions of the profits generated by merchandise sales and foreign currency exchange. Although such transactions have a number of advantages for passengers, airlines and vendors, several difficulties are typically encountered in providing merchandise sales and currency exchange. For example, space limitations significantly restrict the types of merchandise which can be loaded into service carts. Therefore, the merchandise stocked in the service carts tends to be relativity small and high-value. Examples include watches, perfumes, liquor, cigarettes, electronics and other luxury-type items which are typically associated with relatively high duties.

Security and accountability for currency and merchandise are also concerns. They assume even greater significance when foreign currency exchange services are offered because the inventory must include additional cash of various currencies.

Other problems arise from multiple flight crews handling the service carts and the merchandise and currency stocked thereon. Since different flight crews are often involved in outbound, intermediate and return flights, responsibility for goods and currency must be transferred at different stations in route. Still further, currency inventory utilized for conversion and making change for merchandise sales represents assets which are tied up and at risk to the provider.

The present invention addresses the shortcomings of the prior art. Heretofore, there has not been available a system and method for controlling currency exchange and merchandise sales with the advantages and features of the present invention.

SUMMARY OF THE INVENTION

In the practice of the present invention, a currency exchange and merchandise sales system is provided which includes a security drawer for mounting in an airliner service cart packed with merchandise. The security drawer receives currency used for foreign currency exchange (FX) and for merchandise sales transactions. An on-board, point-of-sale (POS) computer is used for inventorying the currency and merchandise and for recording transactions involving same. A cash/currency processing computer (CPC) is located remote from the aircraft and receives data from and transfers data to the POS computer. In the practice of the method of the present invention, merchandise and FX currency are inventoried and loaded in the service cart and the security drawer preflight. Responsibility for the service cart and the security drawer contents are transferred to a flight crew. Merchandise is sold and currency is exchanged in-flight and resulting inventories are reconciled and secured. The service cart and the security drawer are transferred to another flight crew for additional flight legs. Inventory and transaction reports are generated post-flight at an originating station for reconciliation and distributing payments.

OBJECTS AND ADVANTAGES OF THE INVENTION

The principal objects and advantages of the invention include: providing a system for exchanging currency and selling merchandise in-flight; providing such a system which utilizes existing airline service carts; providing such a system which utilizes a point-of-sale (POS) computer and a cash/currency processing computer (CPC) for inventory control, transaction recording, reconciliation and report generation; providing such a system which is relatively secure; providing such a system which is relatively easy to use; providing such a system which requires minimal training; providing such a system which avoids modifying existing airline equipment, such as service carts; providing such a system which requires minimal space on airliners; providing a method for exchanging currency and selling merchandise;

providing such a method which enhances the revenue potential from currency exchange and merchandise sales; providing such a method which is adaptable to various currencies; and providing such a method which is relatively secure and efficient.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an overview of a currency exchange and merchandise sales method embodying the present invention.

FIG. 7 is a cash summary form (CSF).

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
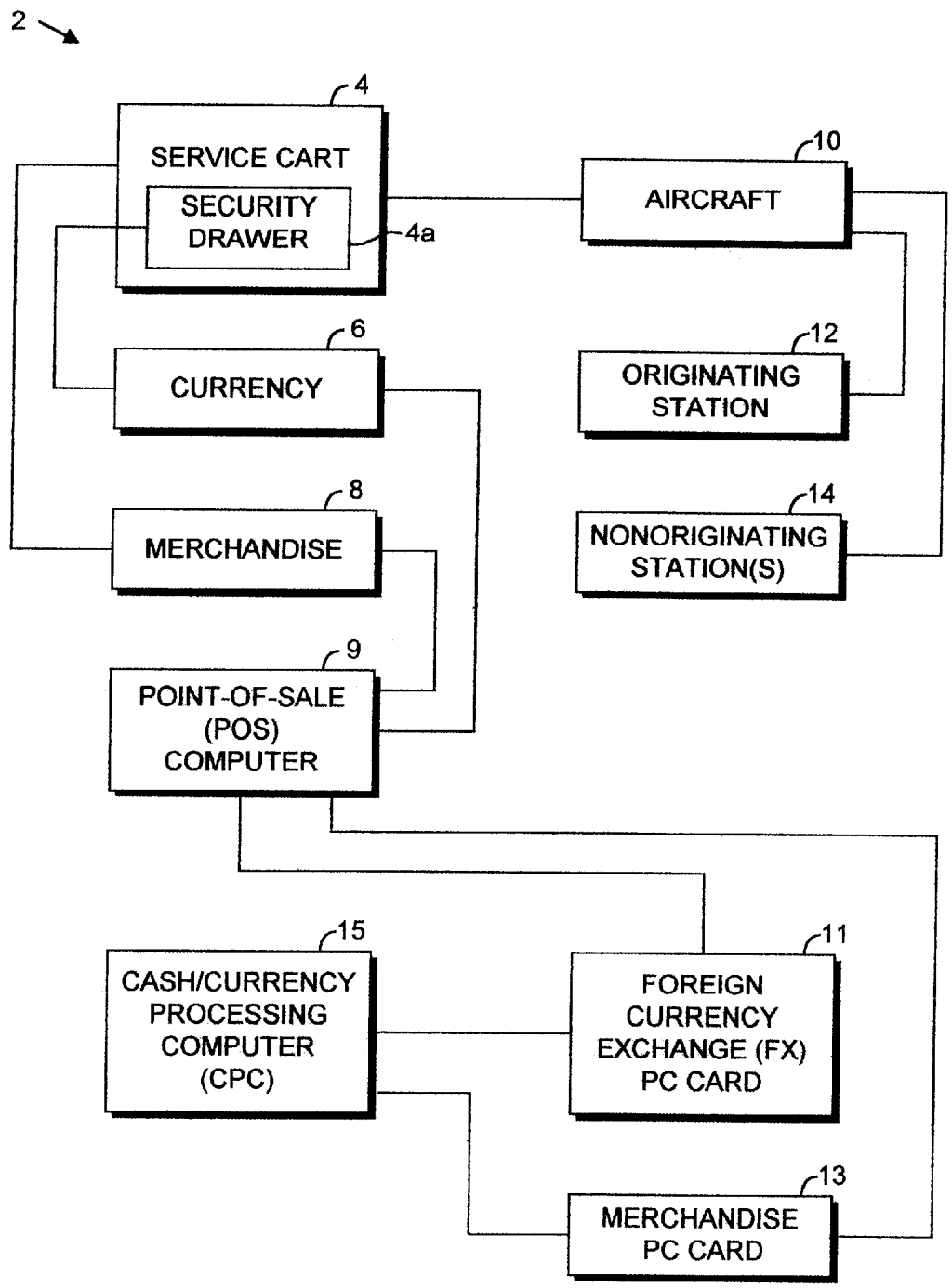
FIG. 1 is a block diagram of a currency exchange and merchandise sales system embodying the present invention.

Referring to the drawings in more detail, the reference numeral 2 generally designates a foreign currency exchange (FX) and merchandise sales system (FIG. 1). The system 2 generally includes a service cart 4 with a locking security drawer 4a for receiving currency 6. Merchandise 8 (e.g., duty-free goods) is received in the service cart 4. The security drawer 4a is the subject of Applicants' co-pending U.S. patent application Ser. No. 09/652,086 for SECURITY DRAWER FOR SERVICE CART, which is assigned to SkyTeller, LLC, a division of First Data Corporation, which is a corporation in the State of Colorado, and U.S. patent application Ser. No. 09/653,498 for CONTROL SYSTEM AND METHOD FOR CURRENCY EXCHANGE AND MERCHANDISE SALES, assigned to SkyTeller, LLC, a division of First Data Corporation, which is a corporation in the State of Colorado. The two additional filings were filed concurrently on Aug. 31, 2000.

Without limitation on the generality of useful applications of the control system 2 and the method, an application in a commercial airliner 10 is shown and described. The aircraft 10 operates out of originating and nonoriginating stations 12, 14 respectively. A point-of-sale (POS) computer 9 is utilized on the aircraft 10 for recording the transactions involving the currency 6 and the merchandise 8. Without limitation on the generality of suitable computing devices, hand-held, touch screen computers available from TouchStar Technologies, LLC of Tulsa, Okla. are suitable for this application. Suitable programming is available from Novo ivc of Warwickshire, England. Data from the POS computer 9 is stored on an FX PC card 11 and a merchandise PC card 13 for transfer to a cash/currency processing computer (CPC) 15 which can be located remote from the aircraft 10 and the airports 12, 14.

II. Currency Exchange and Merchandise Sales Handling Method

FIG. 2 is an overview of a method for handling currency exchange and merchandise sales embodying the present invention. As shown in FIG. 2, the method includes a series of steps occurring as part of a pre-flight at originating station sequence 16 and comprising a merchandise sales decision at 18, packing merchandise at 20, an FX decision at 22, packing FX at 24, inventorying merchandise and FX currency at 26 and loading the service cart 4 on the aircraft 10 at 28. The service cart 4 is transferred to a first or next aircrew at 30, which occurs at either an originating or a non-originating station 12 or 14 at 32.

An in-flight sequence of events 34 includes inventorying currency 6 and merchandise 8 at 36, selling/exchanging same at 38, and reconciling and securing at 40.

A post-flight at originating station sequence of events at 46 includes offloading the service carts 4 at 42 and inventorying same at 44. At a decision box 41 a determination is made if the flight is a return-to-origin flight, in which case the method proceeds to post-flight at originating station 46 or returns to a transfer to first or next aircrew at 30.

Figure 2A:
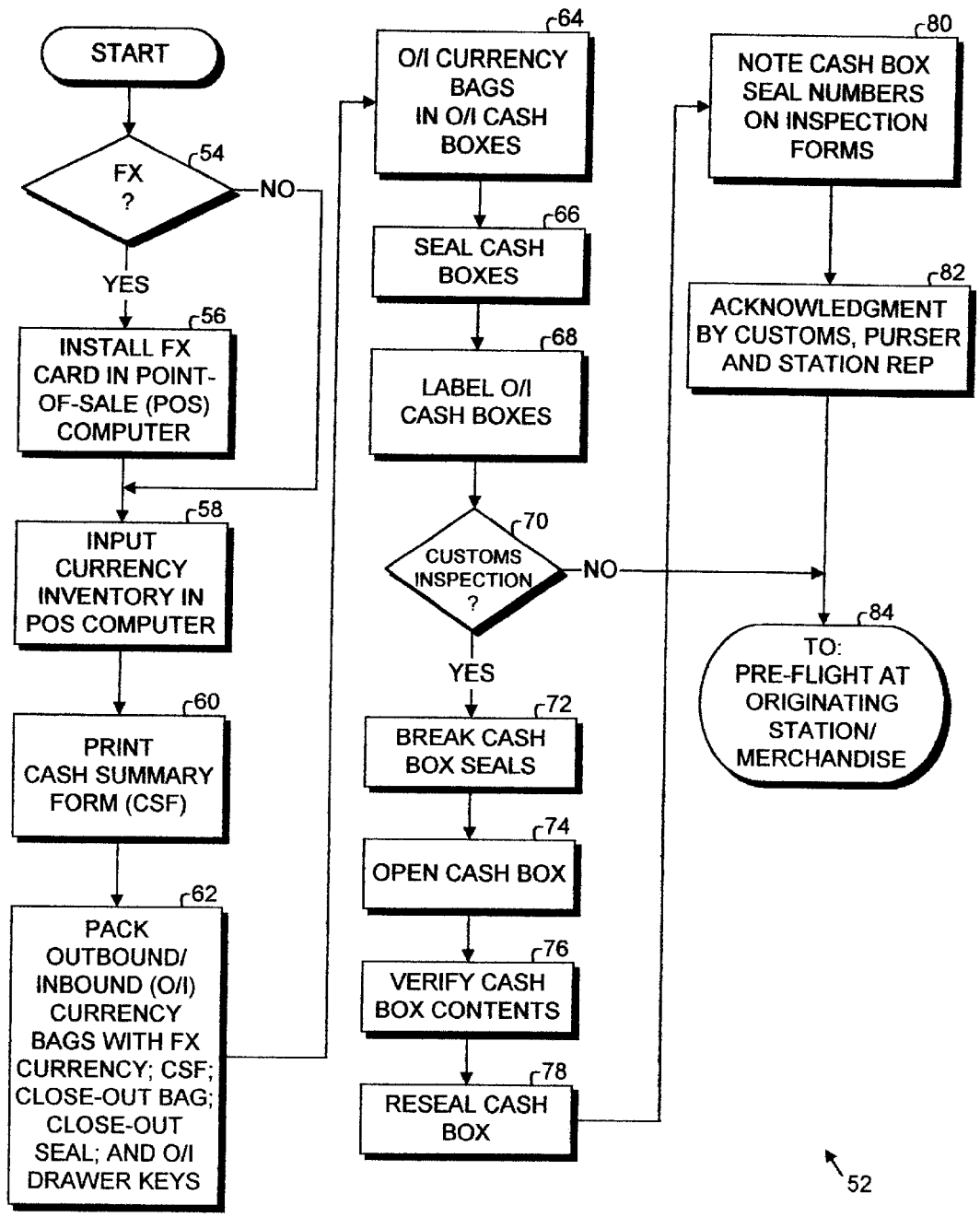
FIGS. 2a–i collectively comprise a flowchart of the method of the present invention.
Figure 4:
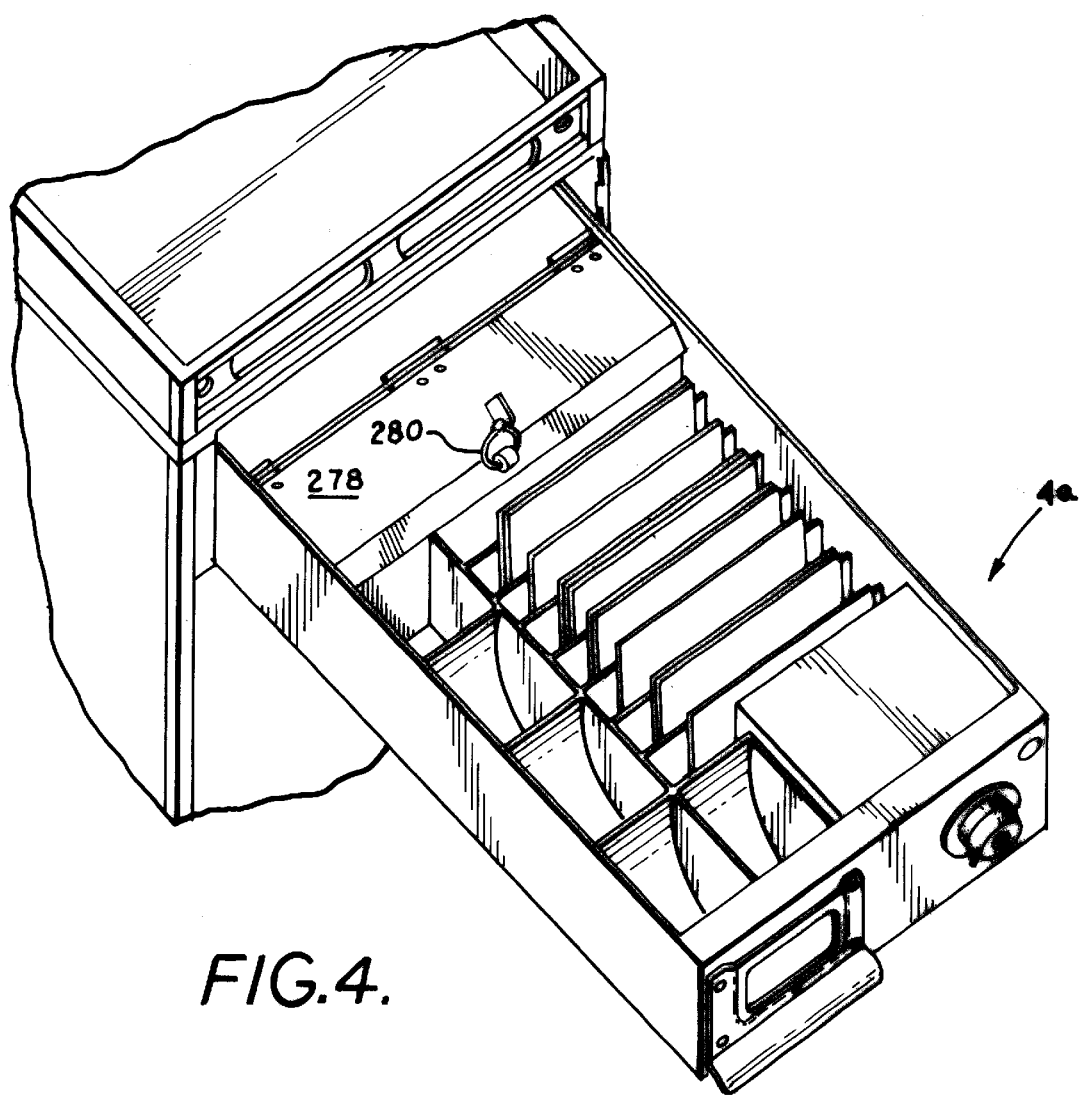
FIG. 4 is an upper, perspective view of the security drawer in an open position.
Figure 5:
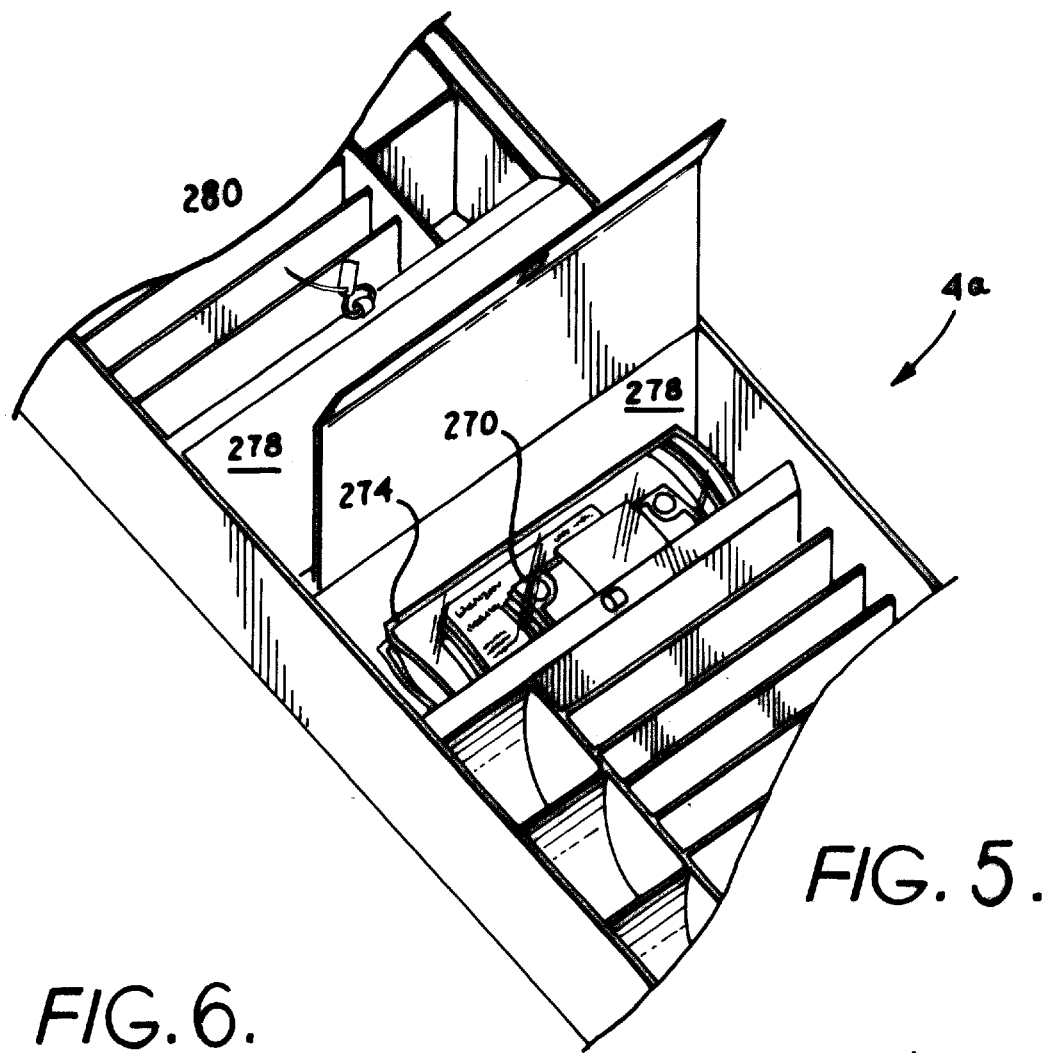
FIG. 5 is an upper, perspective view of the security drawer, showing a cash box thereof in an open position.
Figure 6:
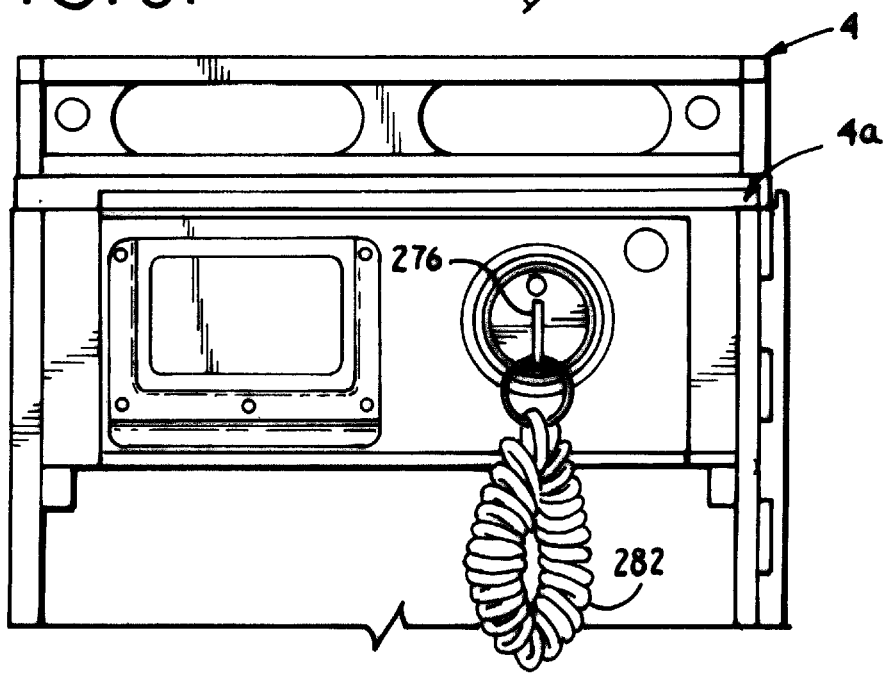
FIG. 6 is a front elevational view of the security drawer with a key therefor in place.

FIG. 2a shows a procedure for pre-flight setup of the security drawer 4a at the originating station 12. A determination is made at 54 if FX will be provided, and if so, an FX card 11 is installed in the POS computer 9 at 56. The currency inventory 270 is input in the POS computer 9 at 58 and a cash summary form (CSF) 272 (FIG. 7) is printed at 60. Outbound/inbound (O/I) currency bags 274 are packed with FX currency, the CSF 272, a closeout bag, a closeout seal and O/I drawer keys 276 at 62. The O/I currency bags 274 are placed in the O/I cash boxes 276 at 64 and the cash boxes are sealed with seals 280 (FIGS. 4 and 5) at 66 and labeled at 68.

A customs inspection decision is made at 70. If affirmative, the cash box seals are broken at 72, the cash box is opened at 74, the cash box contents are verified at 76 and the cash box is resealed at 78. The cash box seal numbers are noted on inspection forms at 80 and acknowledged by a customs official, a purser and a station representative at 82. If customs inspection is not required, or after customs inspection is completed, the method proceeds to preflight at originating station/merchandise at 84.

Figure 2B:
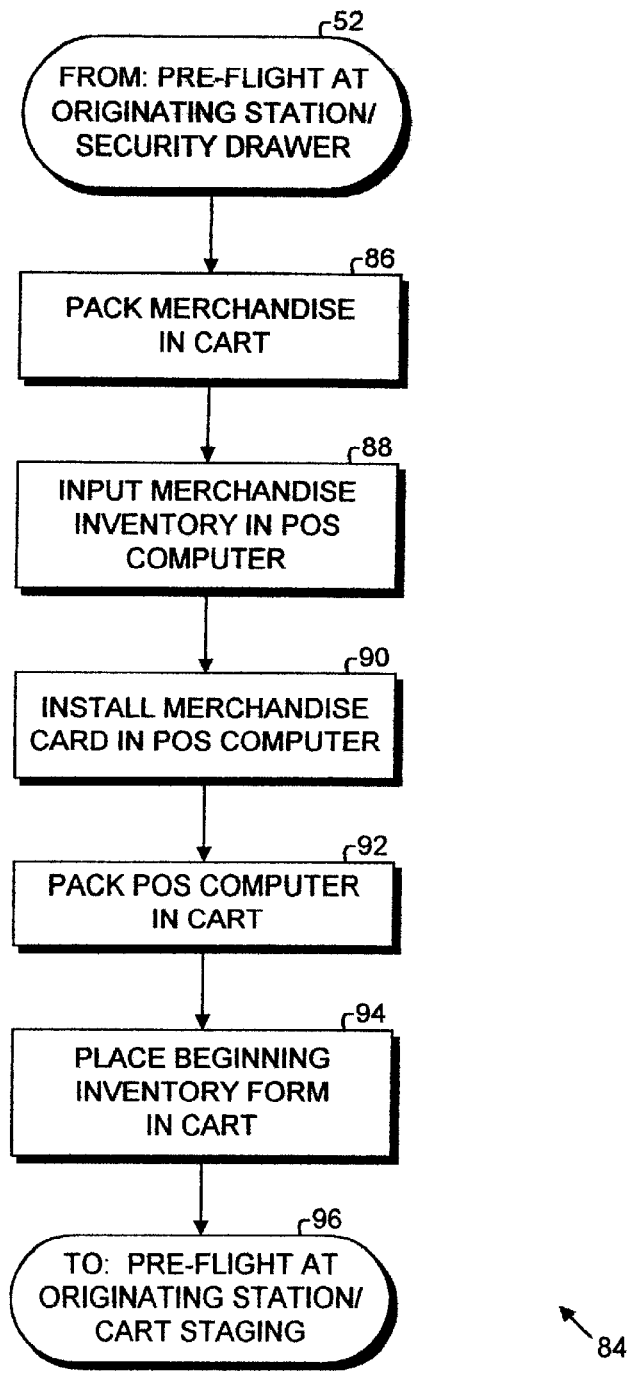

FIG. 2b shows a procedure 84 for loading merchandise 8 preflight at an originating station 12. Merchandise 8 is packed in a service cart 4 at 86. The merchandise inventory is input in the POS computer 9 at 88 and the merchandise card 13 is installed in the POS computer 9 at 90. The POS computer 9 is packed in the service cart 4 at 92. A beginning inventory form is placed in the cart 4 at 94. The method proceeds to preflight at originating station/cart staging at 96.

Figure 2C:
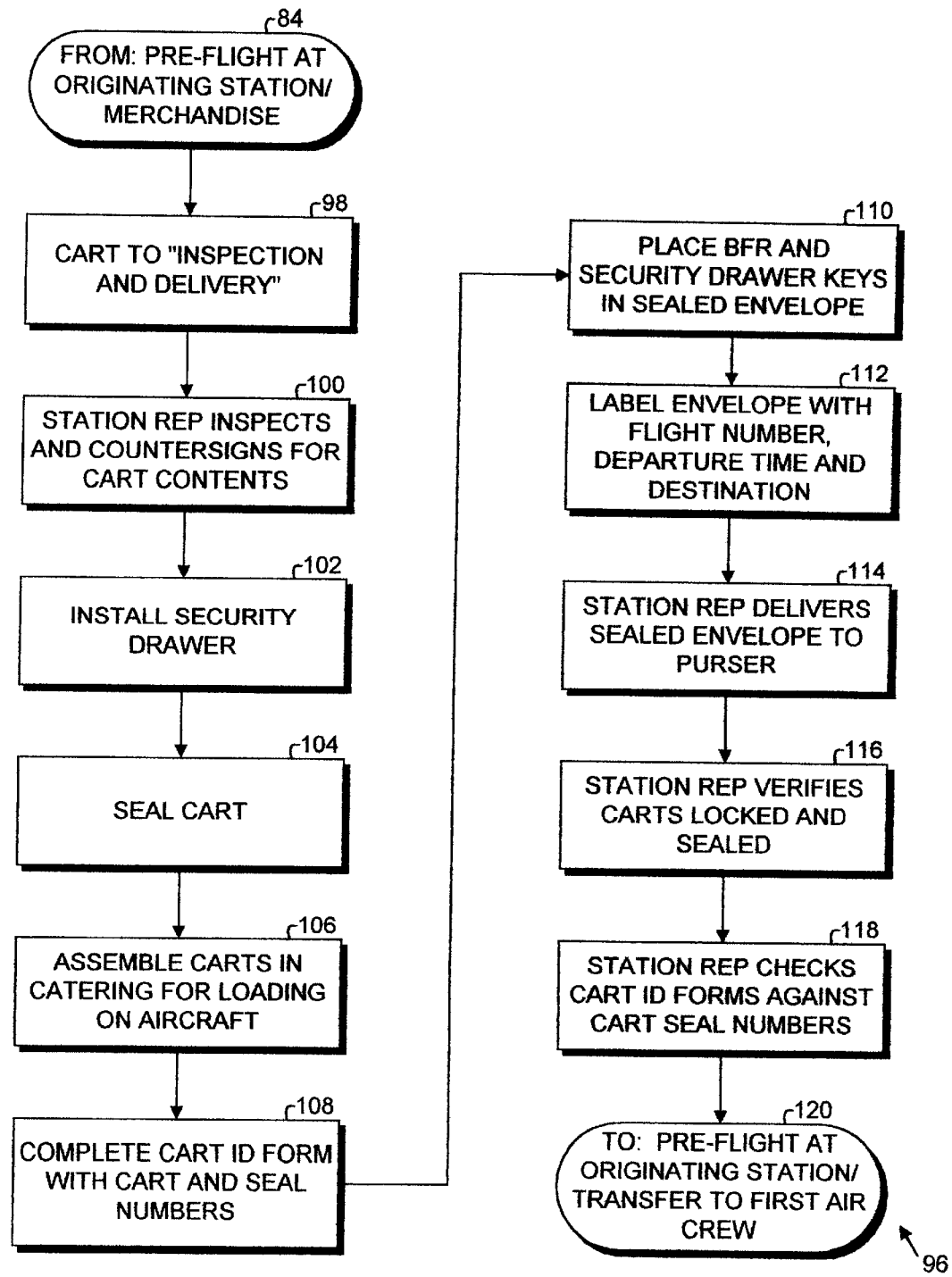

FIG. 2c shows a procedure 96 for cart staging preflight at an originating station 12. The cart 4 is delivered to "inspection and delivery" at 98 and inspected by a station representative who countersigns for its contents at 100. The security drawer 4a is installed at 102 and the cart is sealed at 104. The carts 4 are assembled in catering for loading on the aircraft 10 at 106 and the cart ID forms are completed with cart and seal numbers at 108. The BFR and the security drawer keys 276 are placed in a sealed envelope at 110 and the envelope is labeled with the flight number, departure time and destination at 112. The station representative delivers a sealed envelope to the purser at 114 and verifies that the carts 4 are locked and sealed at 116. The station representative checks the cart identification forms against the cart seal numbers at 118 and the method proceeds to preflight at originating station/transfer to first aircrew at 120.

Figure 2D:
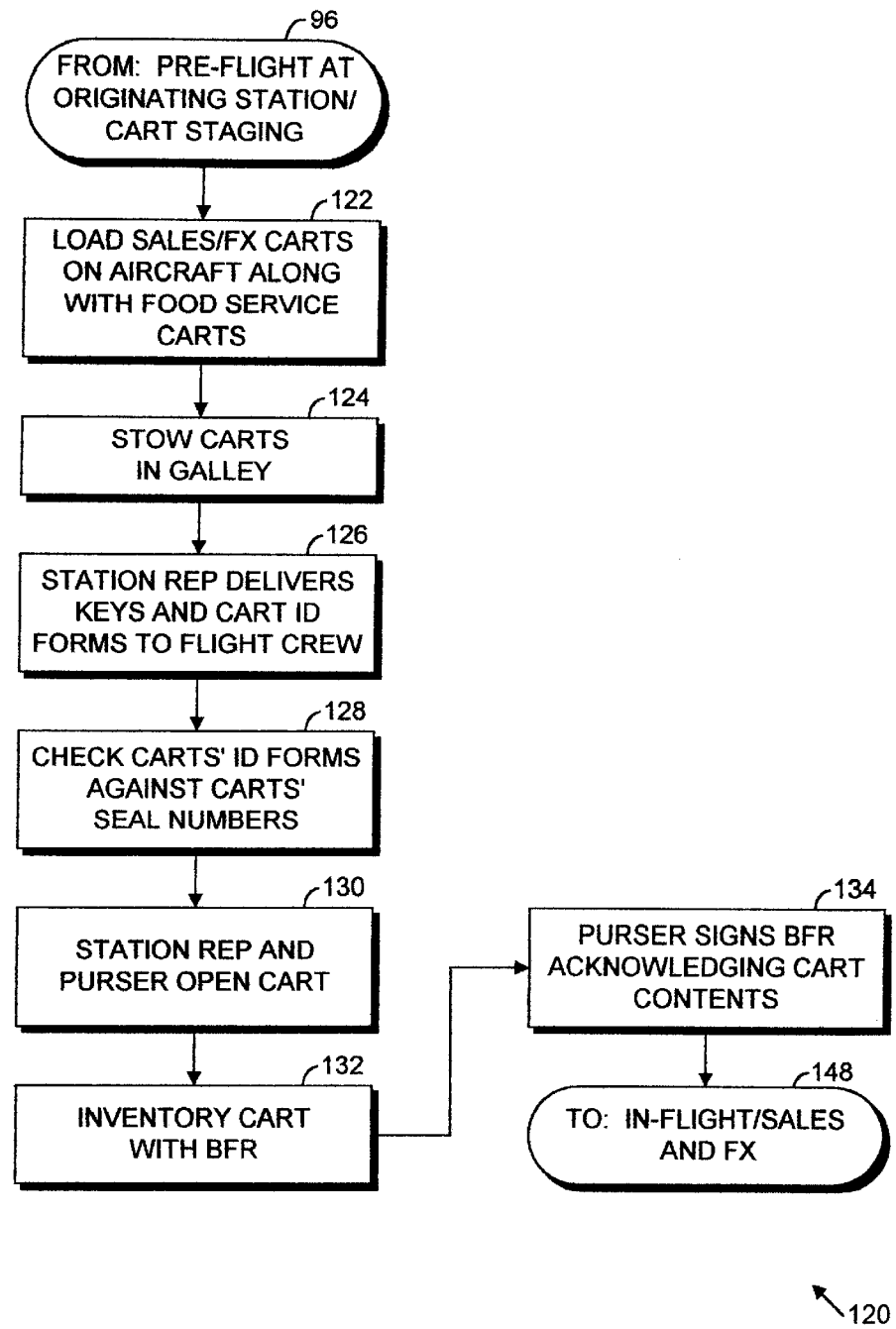

FIG. 2d shows the procedure 120 for transferring the cart 4 to a first aircrew pre-flight at an originating station 12. The cart(s) 4 is loaded on the aircraft 10 along with the food service carts at 122 and stowed in the aircraft's galley at 124. The station representative delivers the cart key and the cart ID forms to the flight crew at 126 and checks the cart's ID forms against the cart's seal numbers at 128. The station representative and the purser open the cart at 130 and inventory its merchandise contents with the BFR at 132. The purser signs the BFR acknowledging the cart merchandise contents at 134. The method proceeds to an in-flight/sales and currency exchange (FX) procedure 136 (FIG. 2f).

Figure 2E:
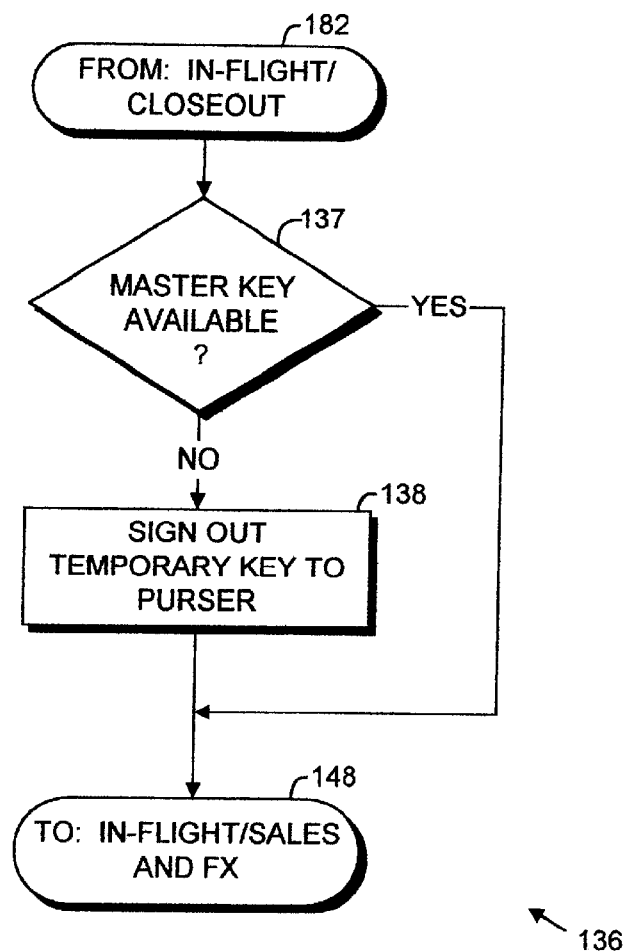

FIG. 2e shows a procedure 136 for transferring the cart 4 to the next aircrew preflight at a nonoriginating station 14. A determination is made at 137 if a master key is available with an IFS, i.e. an "in-charge" or supervisory individual who has been issued a master key for accessing security drawers 4a system-wide for a particular airline. If such a person with a master key is not available, a temporary key for the security drawer 4a can be signed out to the purser at 138. The temporary key is similar to a master key in that it is an electronic key which electroof anically records all operations of the locking mechanisms which it activates, and associates all such operations with the particular number of the temporary key which can be traced back to the purser who signed for it. The method then proceeds to an in-flight sales and FX procedure at 148.

Figure 2F:
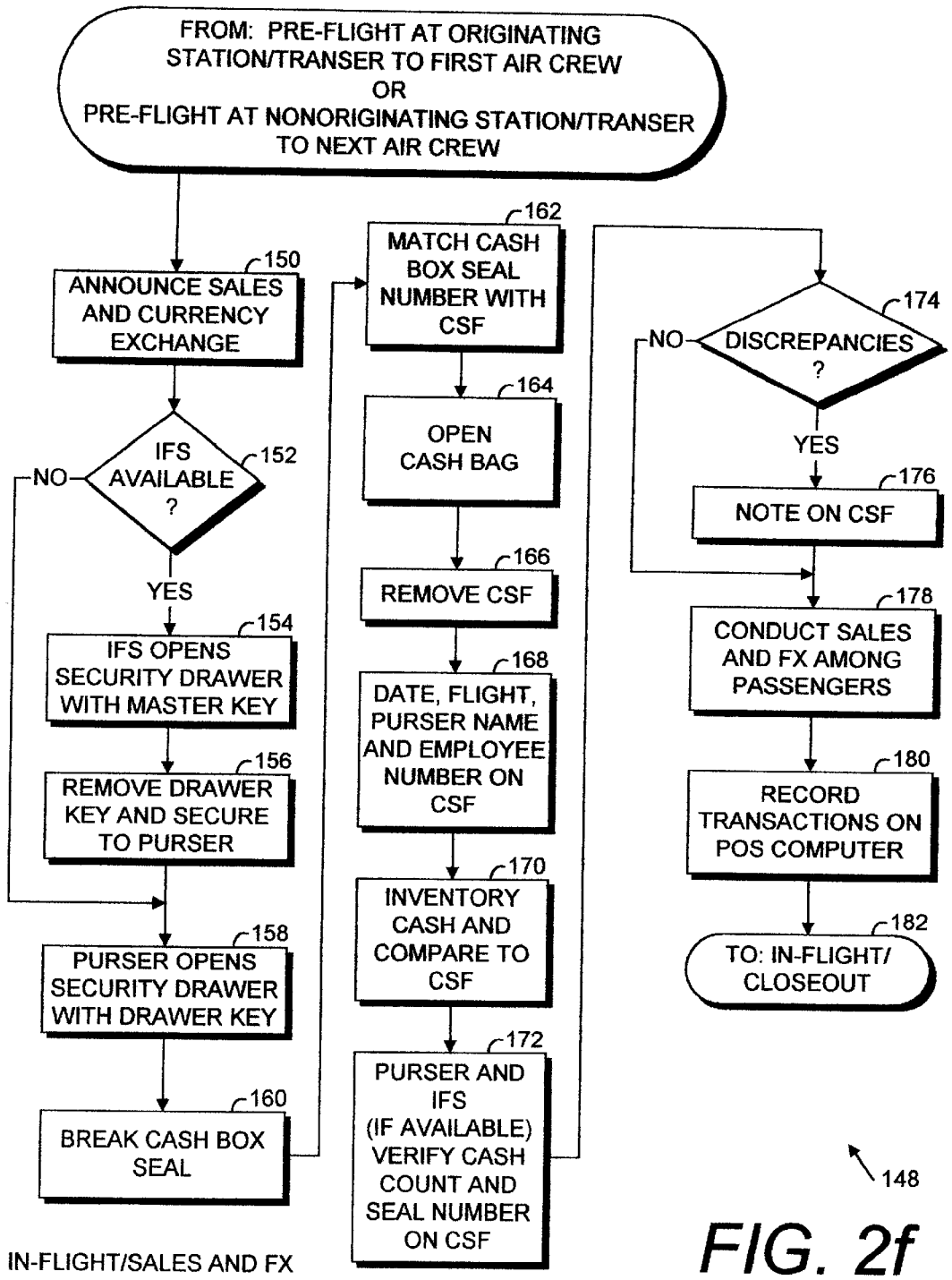

FIG. 2f shows an in-flight sales and FX procedure 148. A sales and currency exchange (FX) announcement is made at 150. The IFS (or supervisor or "in-charge") opens the security drawer 4a with a master key at 154, removes the drawer key 276 and secures it (e.g., with a wrist coil cord 282) to the purser at 156. The purser opens the security drawer 4a with the drawer key 276 at 158 and breaks the cash box seal 280 at 160. The cash box seal number is matched with the CSF at 162 and the cash bag 274 is opened at 164. The CSF 272 is removed at 166 and the date, flight, purser name and purser employee number are noted thereon at 168. The cash is inventoried and compared to the CSF 272 at 170 and the purser and the IFS (if available) verify the cash count and the seal number on the CSF 272 at 172. A determination is made at 174 if there is a discrepancy, in which case it is noted on the CSF 272 at 176. Sales and currency exchange transactions are conducted among the passengers at 178 and the transactions are recorded on the POS computer 9 at 180. The method next proceeds to an in-flight/closeout procedure 182.

Figure 2G:
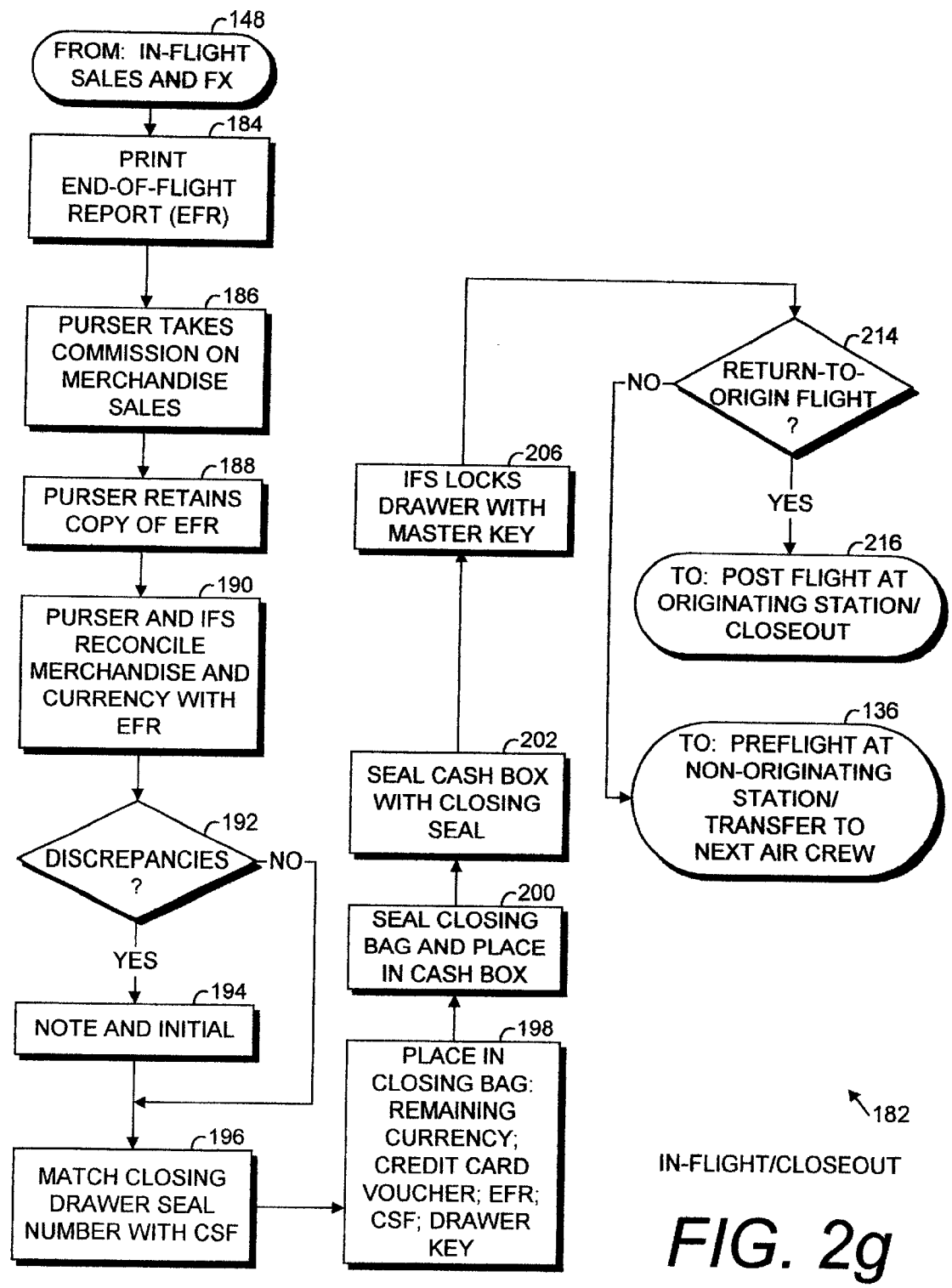

FIG. 2g shows an in-flight/closeout procedure 182. The end-of-flight report (EFR) is printed at 184 and the purser takes a commission on the merchandise sales at 186. The purser retains a copy of the EFR at 188 and reconciles the merchandise and currency with the EFR and with the purser at 190. Discrepancies detected at 192 are noted and initialed at 194. If there are no discrepancies, or after noting same at 194, the closing drawer seal is matched with the CSF 272 whereupon the remaining currency, credit card vouchers, EFR, CSF 272 and drawer key 276 are placed in a closing bag at 198.

The closing bag is sealed and placed in the cash box 278 at 200 and the cash box 278 is sealed with a closing seal at 202. The IFS locks the drawer 4a with a master key at 206. If the flight is a return-to-origin flight detected at 214, the method proceeds to a post flight at originating station/ closeout procedure 216 (FIG. 2h), otherwise the next procedure is pre-flight at non-originating station/transfer to next aircrew 136 (FIG. 2e).

Figure 2H:
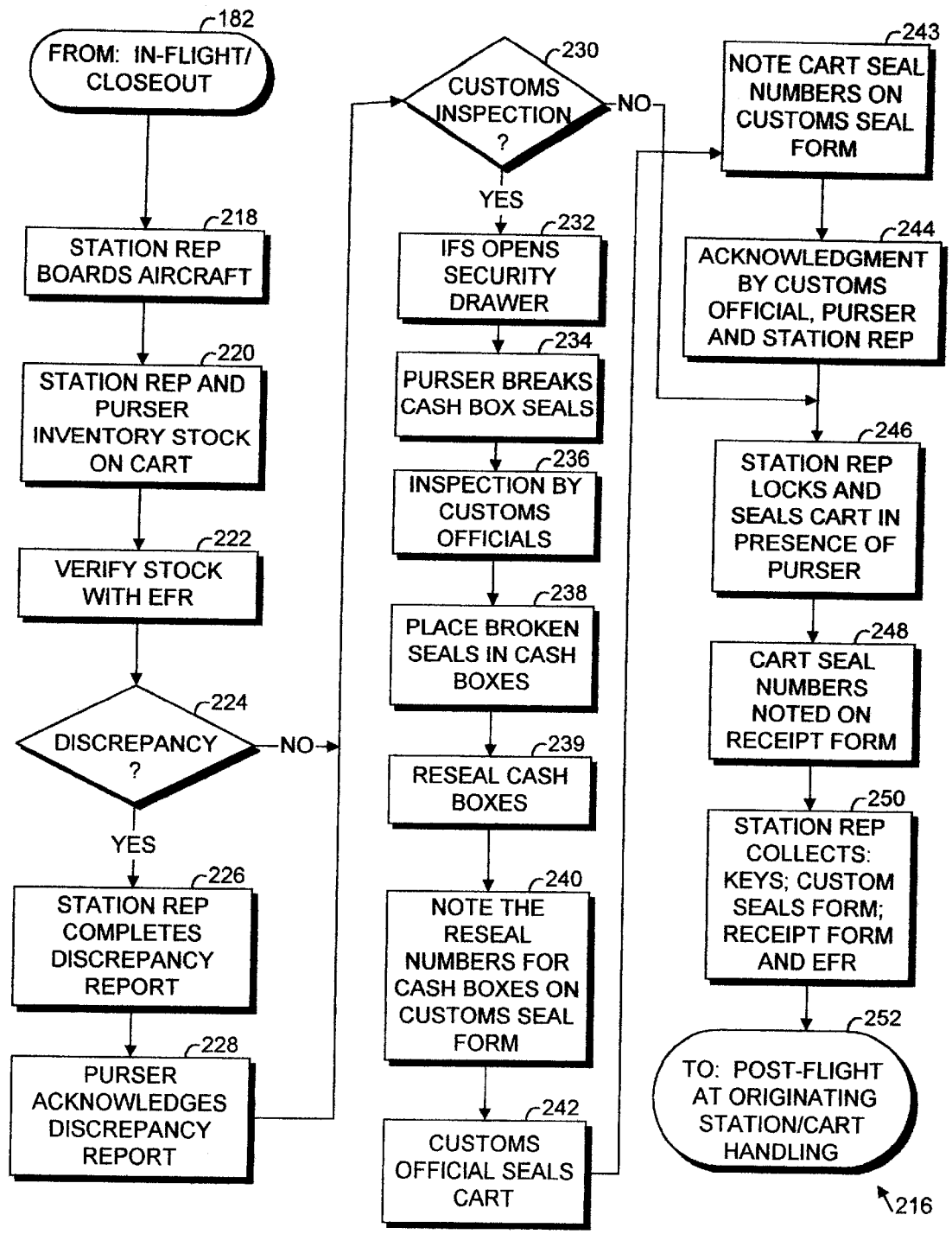

FIG. 2h shows the post-flight at originating station closeout procedure 216, which includes the station representative boarding the aircraft at 218, inventorying thwhome stock on the cart 4 with the purser at 220, verifying the stock with the EFR at 222, detecting any discrepancies at 224 and completing and acknowledging a discrepancy report at 226, 228 respectively. If a customs inspection is required at 230, the IFS opens the security drawer 4a at 232, the IFS breaks the cash box seal 280 at 234, the customs official inspects the contents at 236, the broken seals are placed in the cash boxes 278 at 238, the cash boxes 278 are resealed at 239, the seal numbers are noted on the customs seal form at 240, the customs official seals the cart at 242, the cart seal numbers are noted on the customs seal form at 243 and the customs seal form is acknowledged by the customs official, the IFS and the station representative at 244. The station representative locks and seals the cart 4 in the presence of the purser at 246, the cart seal numbers are noted on the receipt form at 248 and the station representative collects the cart key, the customs seal form, the receipt form and the EFR at 250. The method then proceeds to a procedure 252 for cart handling post-flight at the originating station 12.

Figure 2I:
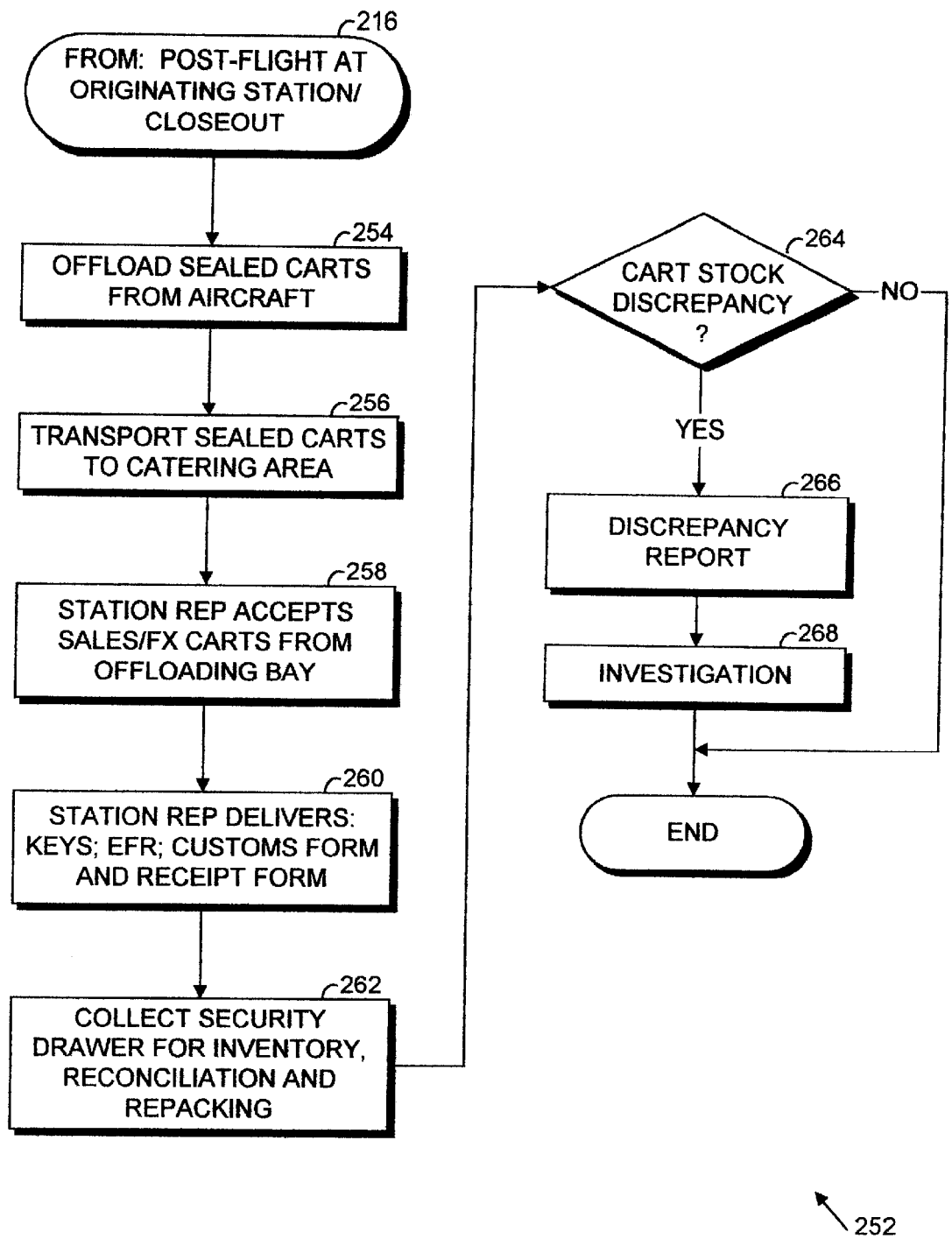
Figure 3:
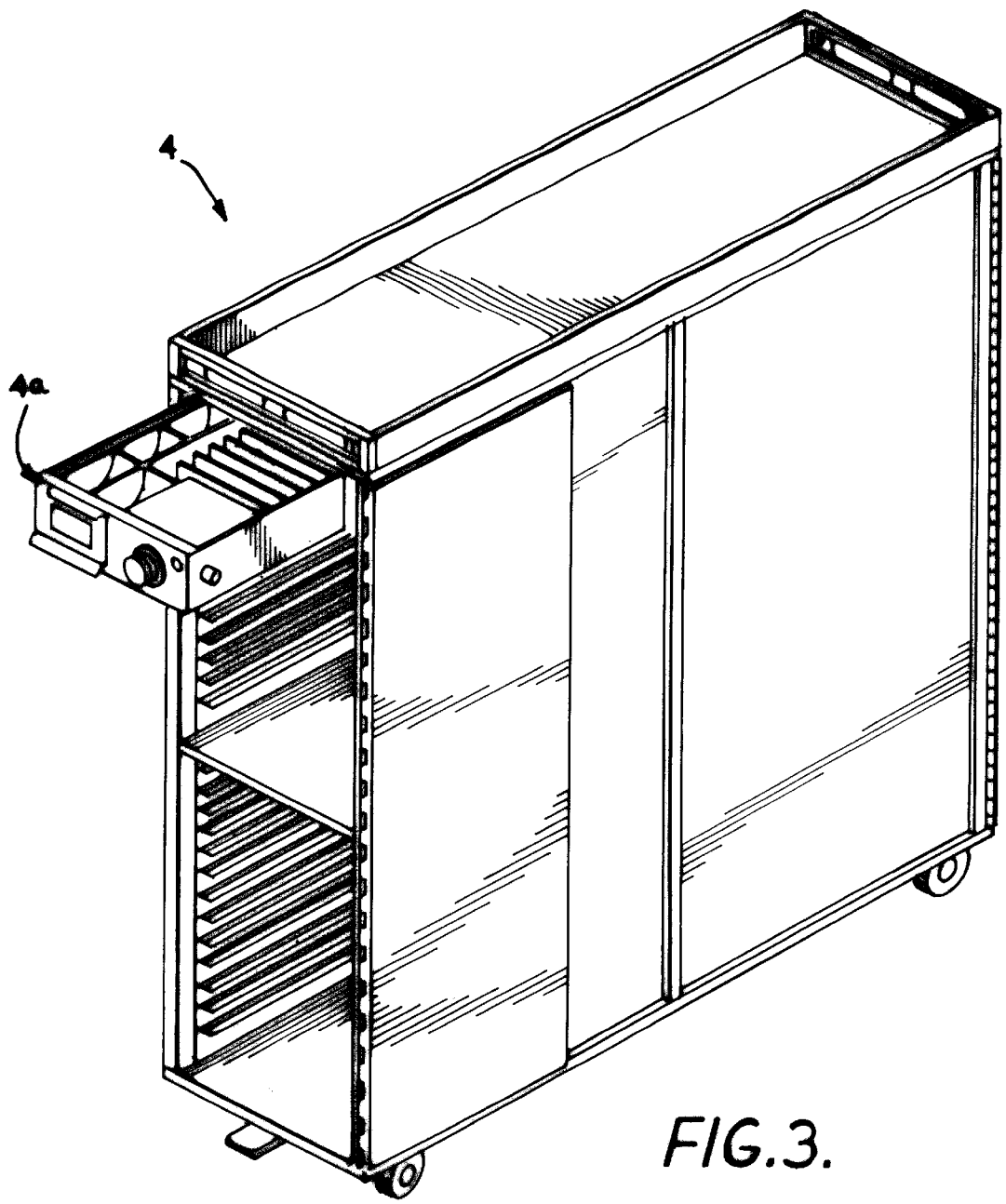
FIG. 3 is an upper, perspective view of a service cart with a security drawer for receiving currency and merchandise.

FIG. 2i shows the post-flight cart handling procedure 252 which occurs at the originating station 12. The sealed cart 4 is offloaded from the aircraft at 254, transported to the catering area at 256, accepted by the station representative at 258 and the station representative delivers the cart key, EFR, customs form and receipt form at 260. The security drawer 4a is collected for inventory, reconciliation and repacking at 262 and any cart stock discrepancies are detected at 264 for producing a discrepancy report at 266 and initiating an investigation at 268.

For security and accountability, we system and method described above utilizes four types of keys: 1) a cart key for opening the main doors on the service cart 4; 2) a master key assigned to an individual by the airline and opening all security drawers 4a system-wide; 3) drawer keys 276 which are programmed to operate only individual security drawer sections, i.e. normally the security drawer section associated with a particular flight; and 4) temporary keys which can be signed out to substitute IFS's in the event the normal IFS with a master key is not available for a particular flight. The master, drawer and temporary keys are all electronic and programmable whereby the electronic, programmable lock mechanisms record and store the key numbers when they are operated. The key numbers are associated with individuals (i.e., IFS's, pursers, flight attendants, etc.) whom they are assigned to for accountability. The use of programmable keys facilitates changes in security procedures and reduces risks if a key is lost since the programmable locks can simply be reprogrammed for the replacement key.

III. First Modified Embodiment Real Time Currency Exchange and Merchandise Sales System 302

Figure 8:
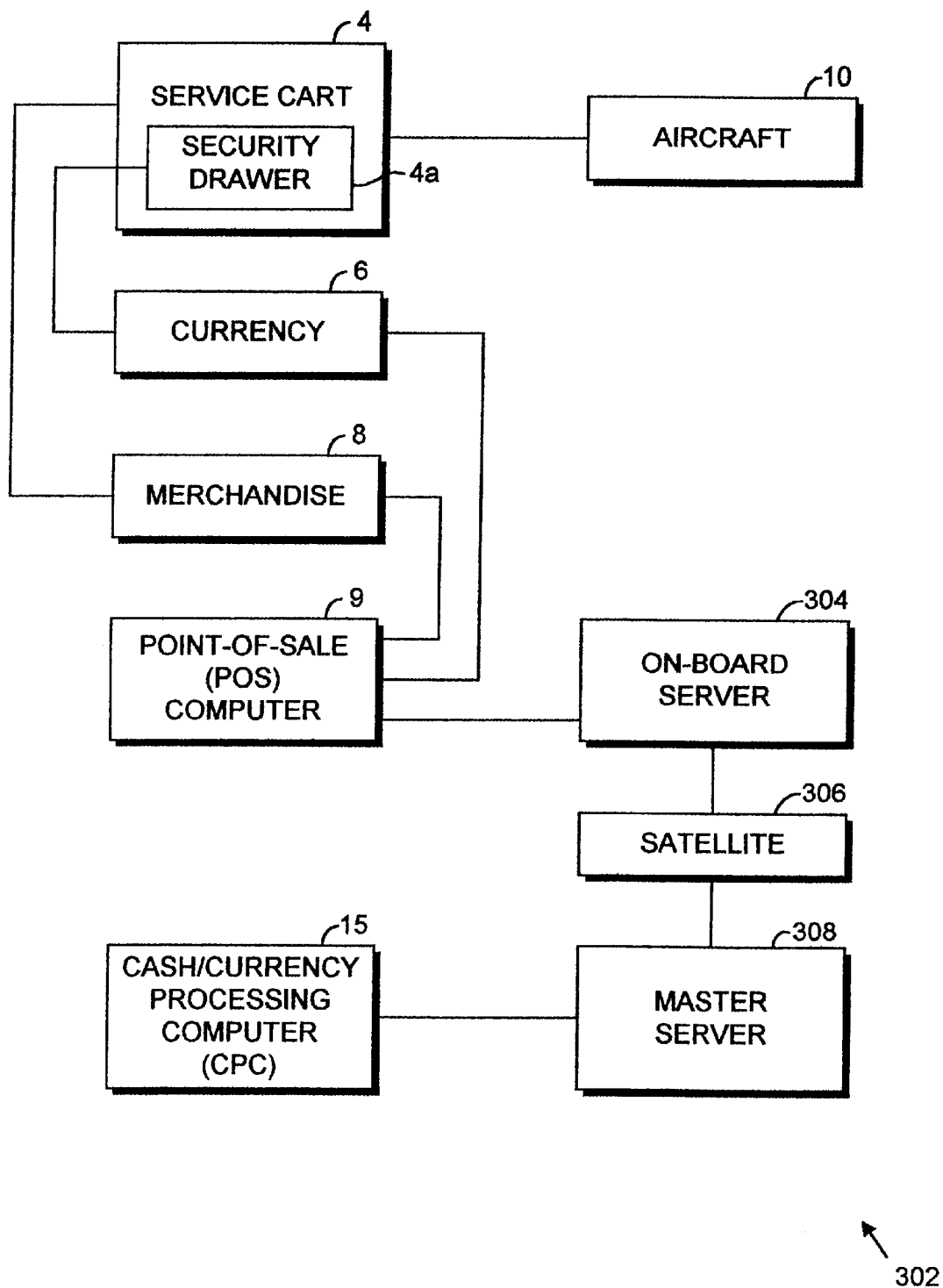
FIG. 8 is a schematic diagram of a real time currency exchange and merchandise sales system comprising a first modified embodiment of the present invention.

FIG. 8 shows a system for handling currency exchange and merchandise sales in real time comprising a first modified embodiment of the present intention. An on-board server 304 is linked (e.g., wireless, RF, hard-wired, etc.) to the POS computer 9 and uploads data to a satellite 306 for downloading to a master server 308 which is linked to the CPC 15. With the system 302, data can flow in both directions between the POS computer 9 and the CPC computer 15. For example, transactions can be charged to passengers' accounts in real time. Another use of the system 302 would be to transmit transactional data to the POS computer 9 in flight.

It is to be understood that while certain forms of the present invention have been illustrated and described herein, it is not to be limited to the specific forms or arrangement of parts described and shown.

What is claimed and desired to be secured by Letters Patent is as follows:

1. A currency exchange and merchandise sales system, which includes:
   a) a point-of-sale currency and merchandise storage device with a compartment for currency and a compartment for merchandise;
   b) a point-of-sale computer associated with said storage device and adapted for recording transactions involving currency exchange and merchandise from said compartments;
   c) a processing computer located remote from the point-of-sale computer; and
   d) a data transfer device for transferring data between said point-of-sale computer and said processing computer.

2. The system according to claim 1, which includes:
   a) said storage device comprising a service cart for a vehicle.

3. The system according to claim 2, which includes:
   a) said currency compartment comprising a locking drawer selectively mounted on said service cart.

4. The system according to claim 1, which includes:
   a) said data transfer device comprising a data card adapted for installation in and data transfer with said point-of-sale computer and said processing computer.

5. The system according to claim 1, which includes:
   a) said point-of-sale computer being adapted to convert different currencies.

6. Be system according to claim 5, which includes:
   a) said point-of-sale computer storing multiple currency rate conversions and merchandise pricing associated with merchandise stored in said storage device.

7. The system according to claim 3, which includes:
   a) said security drawer comprising first and second sections with first and second lock mechanisms respectively; and
   b) first and second keys for said first and second drawer sections respectively.

8. The system according to claim 7, which includes a master key operating said first and second lock mechanisms.

9. The system according to claim 2, which includes:
   a) a cash box within said currency compartment;
   b) a seal selectively securing said cash box;
   c) said card having a door with a lock;
   d) a cart key for said doorlock;
   e) an electronic, programmable, master key operating lock mechanisms in multiple security drawers; and
   f) an electronic, programmable, drawer key operating the lock mechanism of a particular security drawer.

10. The system according to claim 1, which includes:
    a) an on-board server located on the aircraft and linked to the point-of-sale computer for receiving data therefrom and for transferring data to a satellite;
    b) a master server located remote from the aircraft and linked to the processing computer, the master server receiving data from the satellite and transferring same to said processing computer.

11. A method of handling currency exchange on a commercial airline flight, which includes the steps:
    a) providing a service cart with a security compartment;
    b) packing a currency inventory associated with a destination of said flight in said security compartment;
    c) loading said service cart on the aircraft;
    d) providing a flight crew for the flight with access to the security compartment;
    e) accessing the security compartment in flight;
    f) exchanging currency with passengers on the flight;
    g) securing the security compartment;
    h) offloading the service cart from the aircraft; and
    i) inventorying the currency inventory.

12. The method according to claim 11, which includes the additional steps of:
    a) providing a point-of-sale computer; and
    b) loading in said point-of-sale computer data corresponding to said currency inventory.

13. The method according to claim 12, which includes the additional steps of:
    a) including multiple currencies in the currency inventory;
    b) loading the currency exchange rates for said multiple currencies in said point-of-sale computer; and
    c) converting the currency among the passengers.

14. The method according to claim 13, which includes the additional step of:
    a) providing a cash/currency processing computer at a location remote from the aircraft;
    b) loading currency information and merchandise data information in said processing computer; and c) transferring currency inventory data between said point-of-sale computer and said processing computer.

15. The method according to claim 12, which includes the additional steps of:
    a) packing merchandise in the service cart; and
    b) inputting merchandise inventory data in the point-of-sale computer; and
    c) recording sales transactions of said merchandise among said passengers with said point-of-sale computer.

16. The method according to claim 12, which includes the additional steps of:
    a) installing in said point-of-sale computer a data card with currency inventory data;
    b) transferring currency inventory data from said point-of-sale computer to said data card; and
    c) transferring currency inventory data from said card to said processing computer.

17. The method according to claim 15, which include the additional steps of:
    a) providing end-of-flight reports of currency exchange and merchandise sales transactions; and
    b) reconciling currency and merchandise inventories with Sandy in-a-flight reports.

18. The method according to claim 11, which includes the additional steps of:

a) packing outbound and inbound currency bags with exchange currency and a cash summary form;

b) providing the security compartment with respective first and second sections;

c) placing the outbound and inbound currency bags in the security compartment first and second sections respectively;

d) securing the security compartment in a locked position preflight;

e) accessing said first security compartment section on an outbound flight; and f) accessing said second security compartment section on an inbound flight.

19. The method according to claim 15, which includes the additional steps of:

a) providing a merchandise data card;

b) loading merchandise inventory data on said merchandise data card;

c) installing the the merchandise data card in the point-of-sale computer; and d) transferring merchandise transaction data to said merchandise data card.

20. The method according to claim 11, which includes the additional steps of:

a) providing a station representative at an originating station for the flight;

b) providing the station representative with a cart;

c) the station representative transferring the cart key to a flight crew member; and d) the flight crew member opening the cart with the cart key for access to the merchandise located therein.

21. The method according to claim 21, which includes the additional step of:

a) the station representative and the flight crew inventorying the service cart merchandise contents.

22. The method according to claim 18, which includes the additional steps of:

a) providing an in-flight supervisor;

b) providing the in-flight supervisor with a master key said first and second security compartments;

c) providing a flight purser; and d) providing the purser with a compartment key for a respective security compartment.

23. The system according to claim 10, which includes the additional steps of:

a) the flight crew announcing merchandise sales and currency exchange on the flight;

b) opening the first security compartment;

c) inventorying the first security compartment contents and comparing same to a cash summary form therein;

d) conducting merchandise sales and currency exchange with the passengers; and e) recording the merchandise sales and the currency exchange transactions on the point-of-sale computer.

24. The method according to claim 18, which include the additional steps of:

a) the flight crew inventorying the merchandise and the currency after conducting merchandise sales and currency exchange;

b) producing an end-of-flight report;

c) identifying and recording any discrepancies between the end-of-flight report and the inventory results;

d) returning the remaining currency inventory to the security compartment;

e) sealing the security compartment; and f) locking the security drawer first section.

25. The method according to claim 11, which includes the additional steps of:

a) the station representative and the air crew inventorying the cart merchandise contents at an originating station after a return flight; and b) completing a discrepancy report noting any discrepancies between the end-of-flight report and the end-of-flight inventory.

26. The method according to claim 18, which includes the additional steps of:

a) off-loading sealed carts from the aircraft at the originating station;

b) extracting the security compartment from the cart; and c) reconciling the security compartment contents.

* * * * *